(12) United States Patent
Arisawa et al.

(10) Patent No.: US 10,756,666 B2
(45) Date of Patent: Aug. 25, 2020

(54) ELECTRIC-MOTOR DRIVING APPARATUS, ELECTRIC MOTOR SYSTEM AND REFRIGERATION CYCLE APPARATUS

(71) Applicant: Mitsubishi Electric Corporation, Tokyo (JP)

(72) Inventors: Koichi Arisawa, Tokyo (JP); Shinya Toyodome, Tokyo (JP); Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/327,910

(22) PCT Filed: Oct. 13, 2016

(86) PCT No.: PCT/JP2016/080305
§ 371 (c)(1),
(2) Date: Feb. 25, 2019

(87) PCT Pub. No.: WO2018/070005
PCT Pub. Date: Apr. 19, 2018

(65) Prior Publication Data
US 2019/0229670 A1     Jul. 25, 2019

(51) Int. Cl.
*H02P 29/028*     (2016.01)
*H02P 25/22*      (2006.01)
(Continued)

(52) U.S. Cl.
CPC ............ *H02P 29/028* (2013.01); *F25B 31/02* (2013.01); *H02P 25/18* (2013.01); *H02P 25/22* (2013.01);
(Continued)

(58) Field of Classification Search
None
See application file for complete search history.

(56) References Cited

U.S. PATENT DOCUMENTS

| 6,456,033 B1 * | 9/2002 | Nishimura | H02K 17/14 |
| | | | 318/772 |
| 2006/0108957 A1 * | 5/2006 | Urakabe | H02P 25/20 |
| | | | 318/400.28 |

(Continued)

FOREIGN PATENT DOCUMENTS

| JP | 2010-233392 A | 10/2010 |
| JP | 4722069 B2 | 4/2011 |

(Continued)

OTHER PUBLICATIONS

International Search Report of the International Searching Authority dated Dec. 20, 2016 for the corresponding international application No. PCT/JP2016/080305 (and English translation).

*Primary Examiner* — Bentsu Ro
(74) *Attorney, Agent, or Firm* — Posz Law Group, PLC

(57) ABSTRACT

An electric-motor driving apparatus according to the present invention is the electric-motor driving apparatus that drives an electric motor having a winding structure in which a first multi-phase winding and a second multi-phase winding are wound and includes a first DC/AC converter connected to the first multi-phase winding and applying a multi-phase alternating-current voltage to the electric motor, a second DC/AC converter connected to the second multi-phase winding and applying a multi-phase alternating-current voltage to the electric motor, a first three-phase switching unit to perform connecting and disconnecting between phases of the first multi-phase winding, a second three-phase switching unit to perform connecting and disconnecting between phases of the second multi-phase winding, and a winding switching unit to perform connecting and disconnecting between the first multi-phase winding and the second multi-phase winding.

32 Claims, 7 Drawing Sheets

(51) Int. Cl.
*H02P 27/08* (2006.01)
*F25B 31/02* (2006.01)
*H02P 25/18* (2006.01)
*F25B 13/00* (2006.01)

(52) U.S. Cl.
CPC .............. *H02P 27/08* (2013.01); *F25B 13/00* (2013.01); *F25B 2600/021* (2013.01)

(56) References Cited

U.S. PATENT DOCUMENTS

| | | | |
|---|---|---|---|
| 2007/0289794 A1* | 12/2007 | Ishikawa | B60K 6/26 180/165 |
| 2009/0026895 A1* | 1/2009 | Chakrabarti | H02K 3/28 310/68 D |
| 2011/0074323 A1* | 3/2011 | Mukai | B62D 5/0463 318/400.21 |
| 2012/0187893 A1 | 7/2012 | Baba et al. | |
| 2019/0074790 A1* | 3/2019 | Aoyagi | H02P 27/06 |

FOREIGN PATENT DOCUMENTS

| | | |
|---|---|---|
| JP | 4906836 B2 | 1/2012 |
| JP | 5350034 B2 | 8/2013 |
| JP | 2014-204574 A | 10/2014 |

\* cited by examiner

FIG.6

| COMPONENTS | MODE #1 | MODE #2 | MODE #3 | MODE #4 | MODE #5 |
|---|---|---|---|---|---|
| FIRST THREE-PHASE SWITCHING UNIT 61 | OFF | ON | OFF | ON | OFF |
| SECOND THREE-PHASE SWITCHING UNIT 62 | OFF | OFF | ON | ON | OFF |
| WINDING SWITCHING UNIT 50 | OFF | OFF | OFF | OFF | ON |
| FIRST DC/AC CONVERTER 71 | IDLE | HALF-BRIDGE | IDLE | HALF-BRIDGE | FULL-BRIDGE |
| SECOND DC/AC CONVERTER 72 | IDLE | IDLE | HALF-BRIDGE | HALF-BRIDGE | |

ELECTRIC-MOTOR DRIVING APPARATUS, ELECTRIC MOTOR SYSTEM AND REFRIGERATION CYCLE APPARATUS

CROSS REFERENCE TO RELATED APPLICATION

This application is a U.S. national stage application of International Patent Application No. PCT/JP2016/080305 filed on Oct. 13, 2016, the disclosure of which is incorporated herein by reference.

TECHNICAL FIELD

The present invention relates to an electric-motor driving apparatus, an electric motor system, and a refrigeration cycle apparatus which are capable of switching winding specifications of an electric motor.

BACKGROUND

There is a technique for switching winding specifications of an electric motor by switching connection states of windings of the electric motor. Patent Literature 1 discloses a method for driving an electric motor by switching winding specifications using lead wires drawn out by separating the neutral points of windings, and by cooperatively operating the master-side inverter circuit and the slave-side inverter circuit when a winding specification is an open winding specification, or by operating the master-side inverter circuit when a winding specification is a star connection specification.

PATENT LITERATURE

Patent Literature 1: Japanese Patent No. 4906836

Technical Problem

However, according to the technique disclosed in Patent Literature 1, when the master-side inverter circuit which is a single DC/AC converter fails, a normal current path cannot be secured and the apparatus itself is required to be replaced. In addition, because the winding specifications are switched by one short-circuit switch in the technique disclosed in Patent Literature 1, the switchable winding specifications are limited to two. In order to drive the electric motor with high efficiency, it is desirable that winding specifications can be more freely changed according to the operating conditions.

SUMMARY

The present invention has been made to solve the above problems, and an object of the present invention is to provide an electric-motor driving apparatus capable of continuing driving of an electric motor although one DC/AC converter fails and of increasing the degree of freedom in changing winding specifications.

An electric-motor driving apparatus according to an aspect of the present invention is an electric driving apparatus that drives an electric motor having a winding structure in which a first multi-phase winding and a second multi-phase winding are wound, and includes a first inverter connected to the first multi-phase winding and applying a multi-phase alternating-current voltage to the electric motor, and a second inverter connected to the second multi-phase winding and applying a multi-phase alternating-current voltage to the electric motor. The electric-motor driving apparatus according to the present invention further includes a first switching unit to perform connecting and disconnecting between phases of the first multi-phase winding, a second switching unit to perform connecting and disconnecting between the phases of a second multi-phase winding, and a third switching unit to perform connecting and disconnecting between the first multi-phase winding and the second multi-phase winding.

With an electric-motor driving apparatus according to the present invention, it is possible to provide an electric motor system, an electric-motor driving apparatus, and a refrigeration cycle apparatus which are capable of continuing driving of an electric motor even when one DC/AC converter fails and of increasing the degree of freedom in changing winding specifications.

BRIEF DESCRIPTION OF DRAWINGS

FIG. 6 is a diagram illustrating examples of operation modes of the electric motor system according to first embodiment.

DETAILED DESCRIPTION

Hereinafter, an electric motor system, an electric-motor driving apparatus, and a refrigeration cycle apparatus according to embodiments of the present invention are described in detail with reference to the drawings. Note that, the invention is not limited by the embodiments.

First Embodiment

Figure 1:
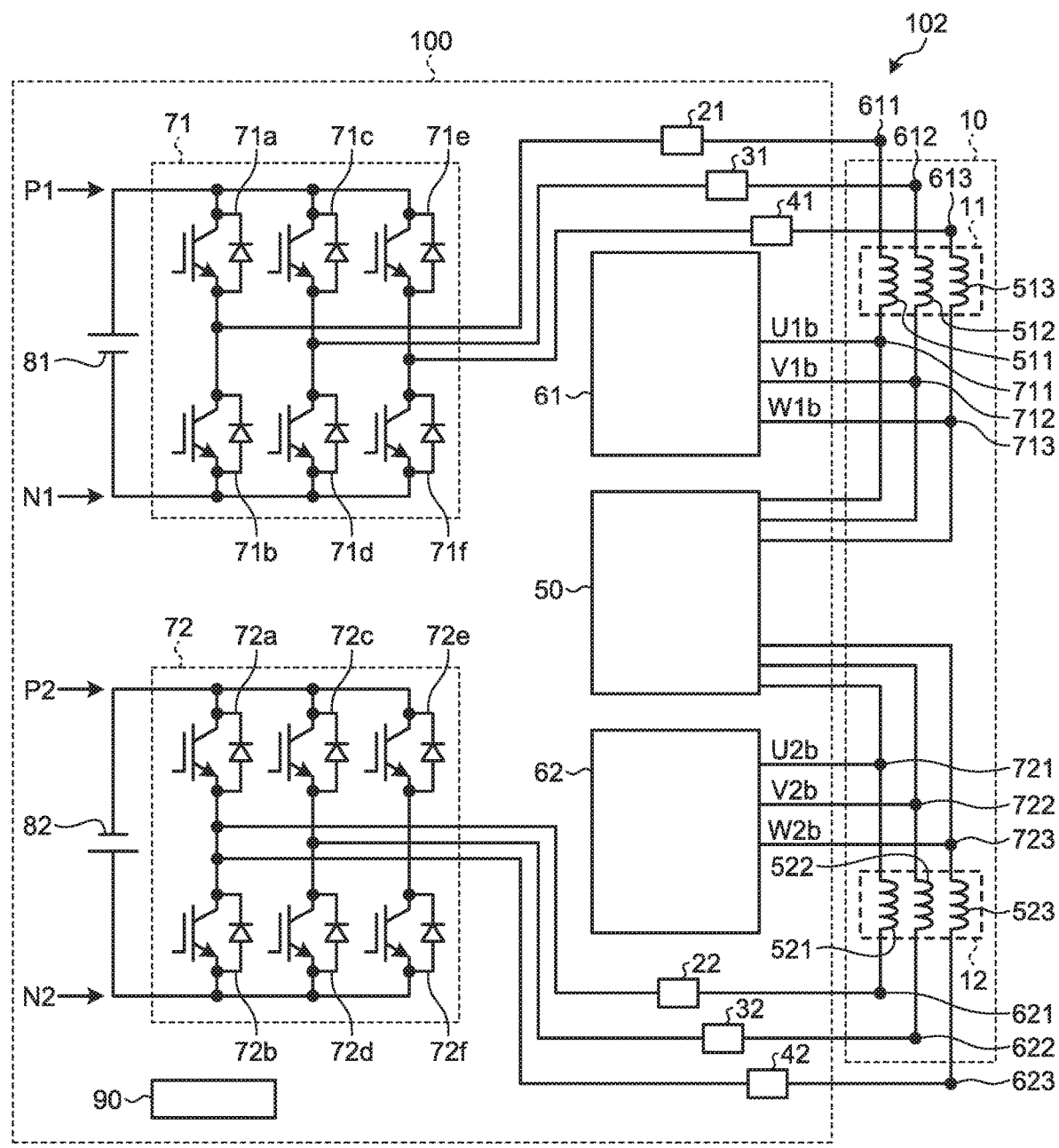
FIG. 1 is a diagram illustrating a configuration example of an electric motor system according to a first embodiment.

FIG. 1 is a diagram illustrating a configuration example of an electric motor system according to a first embodiment of the present invention. As illustrated in FIG. 1, an electric motor system 102 according to the first embodiment includes an electric motor 10 and an electric-motor driving apparatus 100. The electric motor 10 includes a first three-phase winding portion 11 and a second three-phase winding portion 12. The electric-motor driving apparatus 100 includes a DC power supply 81, a DC power supply 82, a first DC/AC converter 71, and a second DC/AC converter 72. The first DC/AC converter 71, to which DC power is input from the DC power supply 81, is connected to the first three-phase winding portion 11. The second DC/AC converter 72, to which DC power is input from the DC power supply 82, is connected to the second three-phase winding portion 12. The electric-motor driving apparatus 100 further includes a winding switching unit 50, a first three-phase switching unit 61, a second three-phase switching unit 62, and a control unit 90. The winding switching unit 50 performs connecting and disconnecting between the first three-phase winding portion 11 and the second three-phase winding portion 12. The first three-phase switching unit 61 performs connecting and disconnecting between phases of the first three-phase winding portion 11. The second three-phase switching unit 62 performs connecting and disconnecting between phases of the second three-phase winding portion 12. The control unit 90 controls the operation of the electric-motor driving apparatus 100.

As illustrated in FIG. 1, among the wirings supplying the DC power input from the DC power supply 81 to the first DC/AC converter 71, the wiring connected to the positive electrode terminal of the DC power supply 81, that is, the positive side wiring is referred to as P1, and the wiring connected to the negative electrode terminal of the DC power supply 81, that is, the negative side wiring is referred to as N1. In addition, among the wirings supplying the DC power input from the DC power supply 82 to the second DC/AC converter 72, the wiring connected to the positive electrode terminal of the DC power supply 82, that is, the positive side wiring is referred to as P2, and the wiring connected to the negative electrode terminal of the DC power supply 82, that is, the negative side wire is referred to as N2. The positive side of the DC power supply 81 is also referred to as a P1 side, the negative side of the DC power supply 81 is also referred to as an N1 side, the positive side of the DC power supply 82 is also referred to as a P2 side, and the negative side of the DC power supply 82 is also referred to as an N2 side.

The first three-phase winding portion 11, which is a first winding portion, includes a U-phase winding portion 511, a V-phase winding portion 512, and a W-phase winding portion 513. The second three-phase winding portion 12, which is a second winding portion, includes a U-phase winding portion 521, a V-phase winding portion 522, and a W-phase winding portion 523. That is, the electric motor 10 has a winding structure in which a first multi-phase winding and a second multi-phase winding are wound. The first multi-phase winding includes a first U-phase winding, a first V-phase winding, and a first W-phase winding. The second multi-phase winding includes a second U-phase winding, a second V-phase winding, and a second W-phase winding.

The first DC/AC converter 71 includes switching elements 71a and 71b, which are a pair of switching elements connected in series, switching elements 71c and 71d, which are a pair of switching elements connected in series, and switching elements 71e and 71f, which are a pair of switching elements connected in series. Each pair of the switching elements 71a and 71b, the switching elements 71c and 71d, and the switching elements 71e and 71f is referred to as an arm. The midpoint of each arm of the first DC/AC converter 71 is connected to the corresponding-phase winding portion of the first three-phase winding portion 11. That is, the first DC/AC converter 71 is connected to the first multi-phase winding and applies a multi-phase alternating-current voltage to the electric motor.

Specifically, the arm constituted by the switching elements 71a and 71b is referred to as a U-phase arm and is connected to the U-phase winding portion 511, the arm constituted by the switching elements 71c and 71d is referred to as a V-phase arm and is connected to the V-phase winding portion 512, and the arm constituted by the switching elements 71e and 71f is referred to as a W-phase arm and is connected to the W-phase winding portion 513. In addition, among the arms, each switching element connected on the P1 side, that is, connected to P1 is also referred to as an upper switching element, and each switching element connected on the N1 side, that is, connected to N1, is also referred to as a lower switching element.

The second DC/AC converter 72 includes switching elements 72a and 72b which are a pair of switching elements connected in series, switching elements 72c and 72d which are a pair of switching elements connected in series, and switching elements 72e and 72f which are a pair of switching elements connected in series. Each pair of the switching elements 72a and 72b, the switching elements 72c and 72d, and the switching elements 72e and 72f is referred to as an arm. The midpoint of each arm of the second DC/AC converter 72 is connected to the corresponding-phase winding portion of the second three-phase winding portion 12. That is, the second DC/AC converter 72 is connected to the second multi-phase winding and applies a multi-phase alternating-current voltage to the electric motor.

Specifically, the arm constituted by the switching elements 72a and 72b is connected to the U-phase winding portion 521, the arm constituted by the switching elements 72c and 72d is connected to the V-phase winding portion 522, and the arm constituted by the switching elements 72e and 72f is connected to the W-phase winding portion 523. In addition, among the arms, each switching element connected on the P2 side, that is, connected to P2 is also referred to as an upper switching element, and each switching element connected on the N2 side, that is, connected to N2, is also referred to as a lower switching element.

As the switching elements of the first DC/AC converter 71 and the second DC/AC converter 72, any type of elements can be used, and a wide bandgap semiconductor, such as gallium nitride (GaN), silicon carbide (SiC), or diamond, can be used. By using a wide bandgap semiconductor, the withstand voltage property becomes high and the permissible current density becomes also high, and it is possible to downsize the module. Because a wide band gap semiconductor has high heat resistance, it is also possible to downsize the heat radiation fin of a heat radiation portion.

Terminals 611, 612, and 613, which are first terminals connected to first end portions among both end portions of the first three-phase winding portion 11, are connected to the first DC/AC converter 71. Specifically, as described above, the terminal 611, which is the first end portion of the U-phase winding portion 511, is connected to the U-phase arm of the first DC/AC converter 71. The terminal 612, which is the first end portion of the V-phase winding portion 512, is connected to the V-phase arm of the first DC/AC converter 71. The terminal 613, which is the first end portion of the W-phase winding portion 513, is connected to the W-phase arm of the first DC/AC converter 71. Terminals 711, 712, and 713, which are second terminals provided at second end portions among both end portions of the first three-phase winding portion 11, are connected to the first three-phase switching unit 61 by three lead wires U1b, V1b, and W1b, respectively, and connected to the winding switching unit 50 by three lead wires.

Terminals 621, 622, and 623, which are first terminals connected to first end portions among both end portions of the second three-phase winding portion 12, are connected to the second DC/AC converter 72. Specifically, as described above, the terminal 621, which is the first end portion of the U-phase winding portion 521, is connected to the U-phase arm of the second DC/AC converter 72, the terminal 622, which is the first end portion of the V-phase winding portion 522, is connected to the V-phase arm of the second DC/AC converter 72, and the terminal 623, which is the first end portion of the W-phase winding portion 523, is connected to the W-phase arm of the second DC/AC converter 72. Terminals 721, 722, and 723, which are second terminals connected to second end portions among both end portions of the second three-phase winding portion 12, are connected to the second three-phase switching unit 62 by three lead wires U2b, V2b, and W2b and connected to the winding switching unit 50 by three lead wires.

That is, the first three-phase winding portion 11 and the second three-phase winding portion 12 each include first end portions, second end portions, and multiple phase winding portions corresponding to multiple phases. The first three-phase winding portion 11 further includes the terminals 611, 612, and 613, which are the first terminals correspondingly connected to the first end portions of the multiple phase winding portions, and the second terminals 711, 712, and 713 correspondingly connected to the second end portions of the multiple phase winding portions. The second three-phase winding portion 12 further includes the terminals 621, 622, and 623, which are the first terminals correspondingly connected to the first end portions of the multiple phase winding portions, and the second terminals 721, 722, and 723 correspondingly connected to the second end portions of the multiple phase winding portions.

In the above configuration, the three-phase windings are formed by drawing 18 lead wires in total out of the electric motor 10 to the outside and by connecting the lead wires drawn to the outside by the first three-phase switching unit 61, the second three-phase switching unit 62, and the winding switching unit 50. Specifically, the first three-phase switching unit 61, which is a first switching unit, performs connecting or disconnecting between the phases of the first three-phase winding portion 11. For example, star connection is realized by connecting the phases of the first three-phase winding portion 11. That is, the first three-phase switching unit 61 switches the connection state between the terminals 711, 712, and 713 of the first three-phase winding portion 11. The second three-phase switching unit 62 performs connecting or disconnecting between the phases of the second three-phase winding portion 12. For example, star connection is realized by connecting the phases of the second three-phase winding portion 12. That is, the second three-phase switching unit 62 switches the connection state between the terminals 721, 722, and 723 of the second three-phase winding portion 12.

The winding switching unit 50, which is a third switching unit, performs connecting or disconnecting between the first three-phase winding portion 11 and the second three-phase winding portion 12. That is, the winding switching unit 50 switches the connection state between the terminals 711, 712, and 713 of the first three-phase winding portion 11 and the terminals 721, 722, and 723 of the second three-phase winding portion 12. Details of the configurations and operation of the first three-phase switching unit 61, the second three-phase switching unit 62, and the winding switching unit 50 are described later.

The electric-motor driving apparatus 100 according to the present embodiment further includes a first DC voltage detection unit (not illustrated) and a second DC voltage detection unit (not illustrated). The first DC voltage detection unit detects a DC voltage of the DC power input from the DC power supply 81 to the first DC/AC converter 71. The second DC voltage detection unit detects a DC voltage of the DC power input from the DC power supply 82 to the second DC/AC converter 72. The first DC voltage detection unit outputs a signal VDC1 indicating the detected DC voltage. The second DC voltage detection unit outputs a signal VDC2 indicating the detected DC voltage. The electric-motor driving apparatus 100 further includes current detection units 21, 31, and 41 and current detection units 22, 32, and 42. The current detection units 21, 31, and 41 detect a signal IU1 indicating the U-phase current flowing through the first three-phase winding portion 11, a signal IV1 indicating the V-phase current, and a signal IW1 indicating the W-phase current respectively. The current detection units 22, 32, and 42 detect a signal IU2 indicating the U-phase current flowing through the second three-phase winding portion 12, a signal IV2 indicating the V-phase current, and a signal IW2 indicating the W-phase current respectively.

The control unit 90 generates, based on Vdc1, Vdc2, Iu1, Iv1, Iw1, Iu2, Iv2, and Iw2 to be described later, six drive signals PWM1 to be input to the switching elements of the first DC/AC converter 71, and six drive signals PWM2 to be input to the switching elements of the second DC/AC converter 72. The control unit 90 further controls the winding switching unit 50, the first three-phase switching unit 61, and the second three-phase switching unit 62.

In this description, it is exemplified that the three phase currents are detected for the first three-phase winding portion 11 and the second three-phase winding portion 12. However, when one phase is estimated from two phase currents on the premise of three-phase balancing, the current detection units for each of the first three-phase winding portion 11 and the second three-phase winding portion 12 may be provided for two phases. In addition, when three-phase currents are estimated from the direct current flowing between the DC power supply 81 and the first DC/AC converter 71 and from the direct current flowing between the DC power supply 82 and the second DC/AC converter 72, two current detection units may be provided; one provided between the DC power supply 81 and the first DC/AC converter 71, and the other provided between the DC power supply 82 and the second DC/AC converter 72. Furthermore, current detection units may be provided between a lower switching element of the first DC/AC converter 71 and N1, and between a lower switching element of the second DC/AC converter 72 and N2 to perform current detection.

Figure 2:
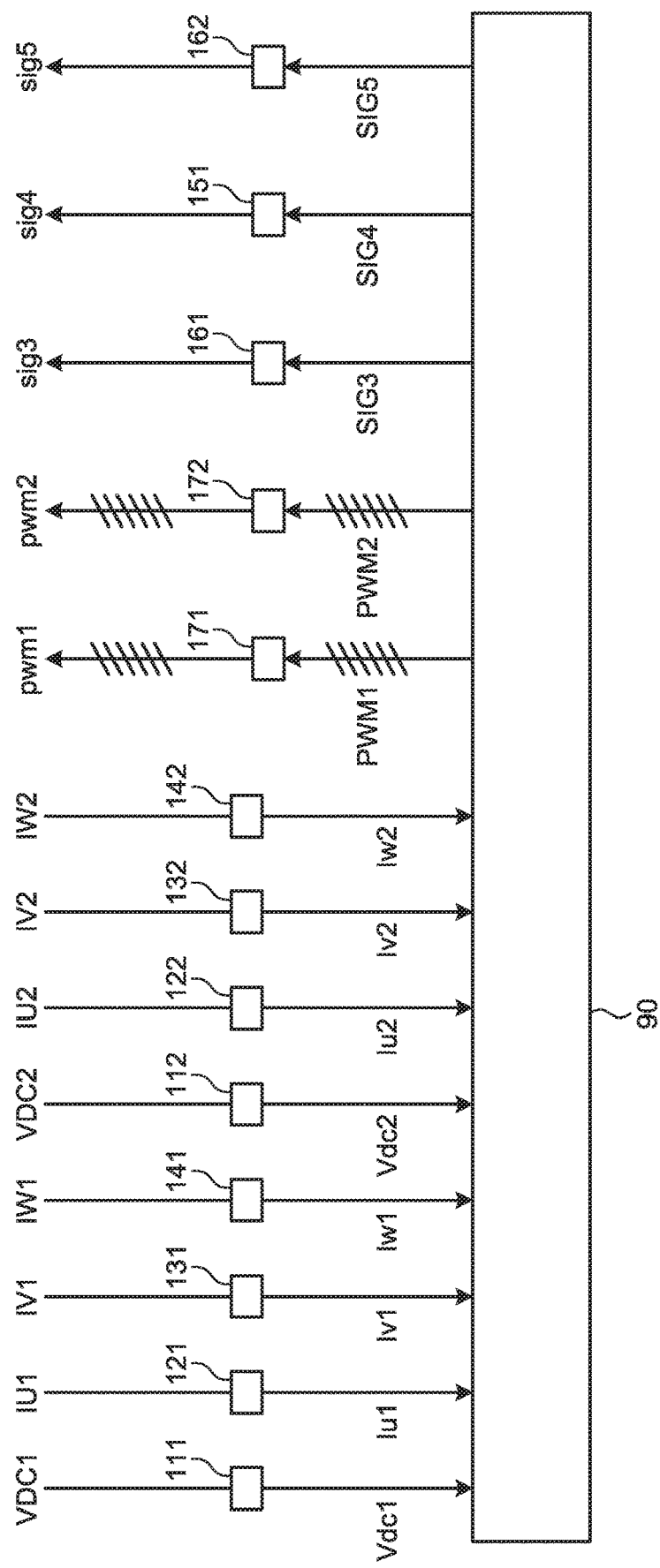
FIG. 2 is a diagram illustrating signals input to a control unit according to the first embodiment and signals output from the control unit.

In FIG. 1, in order to avoid complication of the drawing, the connection relationship between the control unit 90 and each component and the illustration of a voltage level converter to be described later are omitted. The connection relationship between the control unit 90 and each component is described with reference to FIG. 2. FIG. 2 is a diagram illustrating signals input to the control unit 90 and signals output from the control unit 90.

As illustrated in FIG. 2, a signal Vdc1 obtained by converting the level of the signal VDC1 by a voltage level converter 111 is input to the control unit 90. In addition, signals Iu1, Iv1, and Iw1 obtained by converting the levels of the signals IU1, IV1, and IW1 by voltage level converters 121, 131, and 141 respectively are input to the control unit 90.

Note that, each voltage level converter performs voltage-level conversion to a signal to be input to the voltage level converter so that the signal after the level conversion by the voltage level converter to be in an appropriate input voltage range at each component to which the signal output from the voltage level converter is input. Although it is described that the voltage level converters are provided for all signals input to and output from the control unit 90 in this description, a voltage level converter may not be provided for a signal requiring no voltage-level conversion.

In addition, signals Vdc2, Iu2, Iv2, and Iw2 obtained by converting the levels of the signals VDC2, IU2, IV2, and IW2 by voltage level converters 112, 122, 132, and 142 respectively are input to the control unit 90.

The control unit 90 generates, based on an operation mode and the signals Vdc1, Iu1, Iv1, Iw1, Vdc2, Iu2, Iv2, and Iw2, six drive signals PWM1, which are PWM signals for driving the switching elements of the first DC/AC converter 71, and six drive signals PWM2, which are PWM signals for driving the switching elements of the second DC/AC converter 72. The operation mode may be designated from the outside of the electric motor system 102 or may be determined by the control unit 90 based on at least one of a signal input from the outside of the electric motor system 102 and a signal obtained in the electric motor system 102. As to be described later, the operation mode is determined depending on, for example, operating conditions. The six drive signals PWM1 are level-converted by a voltage level converter 171 and input to the switching elements of the first DC/AC converter 71 as six drive signals pwm1. The six drive signals PWM2 are level-converted by a voltage level converter 172 and input to the switching elements of the second DC/AC converter 72 as six drive signals pwm2.

Specifically, the signals PWM1 are PWM signals Up1, Vp1, and Wp1 indicating whether the U-phase, V-phase, and W-phase upper switching elements are turned on or off respectively, and PWM signals Un1, Vn1, and Wn1 indicating whether the U-phase, V-phase and W-phase lower switching elements are turned on or off respectively. The signals Up1, Vp1, Wp1, Un1, Vn1, and Wn1 are converted into signals up1, vp1, wp1, un1, vn1, and wn1 by the voltage level converter 171 respectively. The signals up1, vp1, wp1, un1, vn1, and wn1 are input to the switching elements 71a, 71c, 71e, 71b, 71d, and 71f respectively.

Similarly, the signals PWM2 are PWM signals Up2, Vp2, and Wp2 indicating whether the U-phase, V-phase, and W-phase upper switching elements are turned on or off respectively, and PWM signals Un2, Vn2, and Wn2 indicating whether the U-phase, V-phase and W-phase lower switching elements are turned on or off respectively. The signals Up2, Vp2, Wp2, Un2, Vn2, and Wn2 are converted into signals up2, vp2, wp2, un2, vn2, and wn2 by the voltage level converter 172 respectively. The signals up2, vp2, wp2, un2, vn2, and wn2 are input to the switching elements 72a, 72c, 72e, 72b, 72d, and 72f respectively.

The control unit 90 generates and outputs, depending on the operation mode, a signal SIG3 for controlling the first three-phase switching unit 61, a signal SIG4 for controlling the winding switching unit 50, and a signal SIG5 for controlling the second three-phase switching unit 62. The signals SIG3, SIG4, and SIG5 are level-converted by voltage level converters 161, 151, and 162 respectively and are input as sig3, sig4, and sig5 to the first three-phase switching unit 61, the winding switching unit 50, and the second three-phase switching unit 62 respectively. The signals SIG3, SIG4, SIG5 are binary signals, and each of the values of SIG3, SIG4, and SIG5 is at a High level or a Low level. For example, when the values of the signals SIG3, SIG4, and SIG5 are at High levels, this indicates that each switch to be described later is turned on, that is, closed. Alternatively, when the values of the signals SIG3, SIG4, and SIG5 are at Low levels, this indicates that each switch to be described later is turned off, that is, opened. The correspondence between the signal level and on/off is not limited to this example. The signals sig3, sig4, and sig5 are also binary signals each having a value at a High level or a Low level although actual voltage levels are different from those of the signals SIG3, SIG4 and SIG5.

Figure 3:
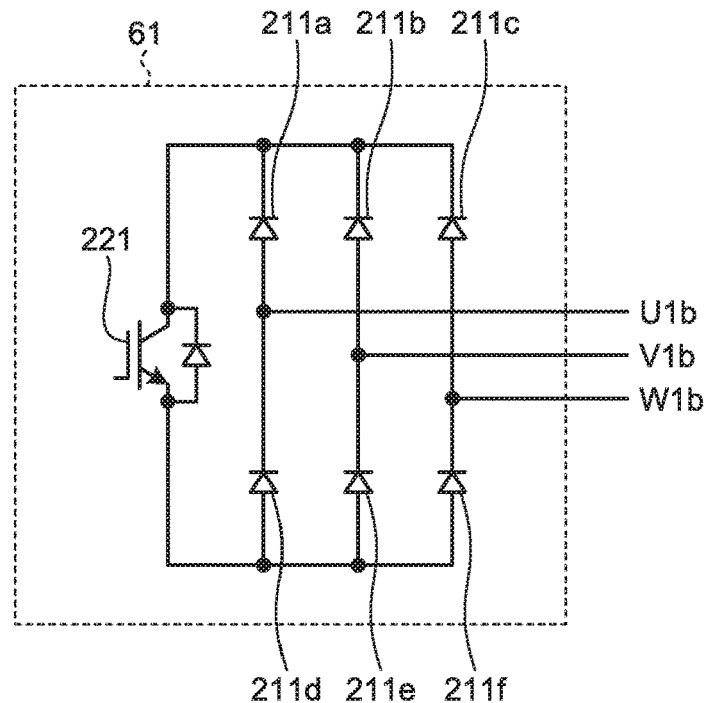
FIG. 3 is a diagram illustrating a configuration example of a first three-phase switching unit according to the first embodiment.

FIG. 3 is a diagram illustrating a configuration example of the first three-phase switching unit 61 according to the present embodiment. As illustrated in FIG. 3, the first three-phase switching unit 61 includes rectifiers 211a, 211b, 211c, 211d, 211e, and 211f, which are diodes or the like, and a switch 221. The switch 221 is implemented by a switch, a mechanical relay, a semiconductor switch, that is, a switching element formed of a semiconductor, or the like. The rectifiers 211a and 211d are connected in series, the rectifiers 211b and 211e are connected in series, and the rectifiers 211c and 211f are connected in series. The rectifiers 211a and 211d, the rectifiers 211b and 211e, and the rectifiers 211c and 211f are connected in parallel. The lead wire U1b is connected to the midpoint between the rectifiers 211a and 211d, the lead wire V1b is connected to the midpoint between the rectifiers 211b and 211e, and the lead wire W1b is connected to the midpoint between the rectifiers 211c and 211f. The switch 221 is turned on when the value of the signal sig3 is at a High level, and is turned off when the value of the signal sig3 is at a Low level.

When the switch 221 is turned on, the lead wires U1b, V1b, and W1b are connected via the rectifiers 211a, 211b, 211c, 211d, 211e, and 211f. As a result, the terminals 711, 712, and 713 of the first three-phase winding portion 11 are connected. Thus, the U-phase winding portion 511, the V-phase winding portion 512, and the W-phase winding portion 513 are star-connected. That is, the winding specification of the first three-phase winding portion 11 is a specification corresponding to the star-connected winding.

When the switch 221 is turned off, the U-phase winding portion 511, the V-phase winding portion 512, and the W-phase winding portion 513 are disconnected from each other.

Figure 4:
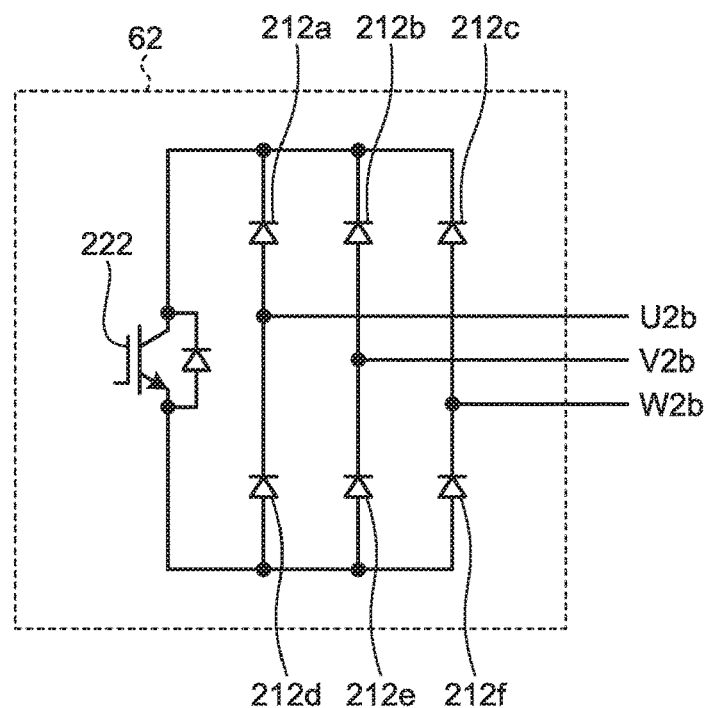
FIG. 4 is a diagram illustrating a configuration example of a second three-phase switching unit according to the first embodiment.

FIG. 4 is a diagram illustrating a configuration example of the second three-phase switching unit 62 according to the present embodiment. As illustrated in FIG. 4, the second three-phase switching unit 62 includes rectifiers 212a, 212b, 212c, 212d, 212e, and 212f, which are diodes or the like, and a switch 222. The switch 222 is implemented by a switch, a mechanical relay, a switching element formed of a semiconductor, or the like. The rectifiers 212a and 212d are connected in series, the rectifiers 212b and 212e are connected in series, and the rectifiers 212c and 212f are connected in series. The rectifiers 212a and 212d, the rectifiers 212b and 212e, and the rectifiers 212c and 212f are connected in parallel. The lead wire U2b is connected to the midpoint between the rectifiers 212a and 212d, the lead wire V2b is connected to the midpoint between the rectifiers 212b and 212e, and the lead wire W2b is connected to the midpoint between the rectifiers 212c and 212f. The switch 222 is turned on when the value of the signal sig5 is at a High level, and is turned off when the value of the signal sig5 is at a Low level.

When the switch 222 is turned on, the lead wires U2b, V2b and W2b are connected via the rectifiers 212a, 212b, 212c, 212d, 212e, and 212f. As a result, the terminals 721, 722, and 723 of the second three-phase winding portion 12 are connected. Thus, the U-phase winding portion 521, the V-phase winding portion 522, and the W-phase winding portion 523 are star-connected. That is, the winding specification of the second three-phase winding portion 12 is a specification corresponding to the star-connected winding.

When the switch 222 is turned off, the U-phase winding portion 521, the V-phase winding portion 522, and the W-phase winding portion 523 are not connected, that is, disconnected from each other.

As described above, the first three-phase switching unit 61 connects the terminals 711, 712, and 713 of the first three-phase winding portion 11 so as to star-connect the first three-phase winding portion 11 when the signal sig3 is at a High level, that is, when the connection state is indicated as connection, and does not connect the terminals 711, 712, and 713 of the first three-phase winding portion 11 when the signal sig3 is at a Low level, that is, the connection state is indicated as disconnection. The second three-phase switching unit 62 connects the terminals 721, 722, and 723 of the second three-phase winding portion 12 so as to star-connect the second three-phase winding portion 12 when the signal sig5 is at a High level, that is, when the connection state is indicated as connection, and does not connect the terminals 721, 722, and 723 of the second three-phase winding portion 12 when the signal sig5 is at a Low level, that is, when the connection state is indicated as disconnection.

Figure 5:
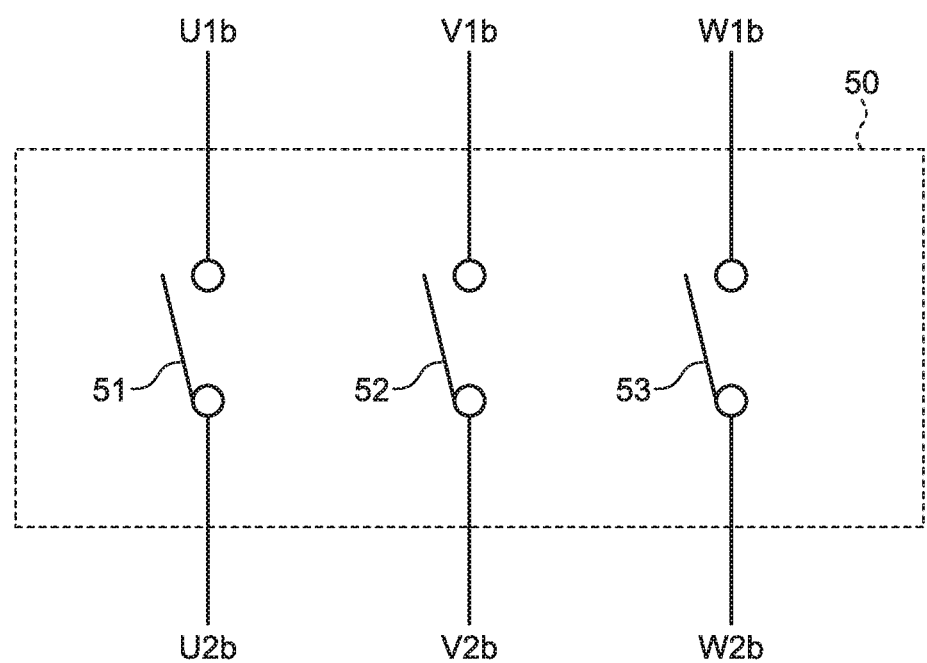
FIG. 5 is a diagram illustrating a configuration example of a winding switching unit according to the first embodiment.

FIG. 5 is a diagram illustrating a configuration example of the winding switching unit 50 according to the present embodiment. As illustrated in FIG. 5, the winding switching unit 50 includes switches 51, 52, and 53. The switches 51, 52, and 53 each are implemented by a switch, a mechanical relay, a switching element formed of a semiconductor, or the like. One end of the switch 51 is connected to the lead wire U1b, and the other end is connected to the lead wire U2b. One end of the switch 52 is connected to the lead wire V1b, and the other end is connected to the lead wire V2b. One end of the switch 53 is connected to the lead wire W1b, and the other end is connected to the lead wire W2b.

The connection states of the switches 51, 52, and 53, that is, the states whether the switches 51, 52, 53 are turned on or off are the same. When the signal sig4 input from the voltage level converter 151 is at a High level, the switches 51, 52 and 53 are turned on. When the signal sig4 is at a Low level, the switches 51, 52, and 53 are turned off.

For example, when the signal sig4 is at a High level, the switches 51, 52, and 53 are turned on, and the lead wires U1b and U2b, the lead wires V1b and V2b, and the lead wires W1b and W2b are connected. In this manner, when the signal sig4 is at a High level, the first three-phase winding portion 11 and the second three-phase winding portion 12 are connected. On the other hand, when the signal sig4 is at a Low level, the first three-phase winding portion 11 and the second three-phase winding portion 12 are not connected.

As described above, the switch 51 of the winding switching unit 50 is a U-phase switch that switches the state of connection between the U-phase winding portion 511, which is the U-phase winding portion of the first three-phase winding portion 11, and the U-phase winding portion 521, which is the U-phase switching portion of the second three-phase winding portion 12, between connection and disconnection. The switch 52 of the winding switching unit 50 is a V-phase switch that switches the state of connection between the V-phase winding portion 522, which is the V-phase winding portion of the first three-phase winding portion 11, and the V-phase winding portion 512, which is the V-phase winding portion of the second three-phase winding portion 12, between connection and disconnection. The switch 53 of the winding switching unit 50 is a W-phase switch that switches the state of connection between the W-phase winding portion 513, which is the W-phase winding portion of the first three-phase winding portion 11, and the W-phase winding portion 523, which is the W-phase winding portion of the second three-phase winding portion 12, between connection and disconnection.

As described above, it is possible for the electric motor system 102 according to the present embodiment to switch winding specifications of the electric motor 10 depending on the states of the winding switching unit 50 that switches the state of connection between the first three-phase winding portion 11 and the second three-phase winding portion 12, the first three-phase switching unit 61 that switches the state of connection between the phases of the first three-phase winding portion 11, and the second three-phase switching unit 62 that switches the state of connection between the phases of the second three-phase winding portion 12.

FIG. 6 is a diagram illustrating examples of operation modes of the electric motor system 102 according to the present embodiment. As illustrated in FIG. 6, five operation modes from a mode #1 to a mode #5 are described in this description. FIG. 6 illustrates, for each mode, ON/OFF states of switches of the first three-phase switching unit 61, the second three-phase switching unit 62, and the winding switching unit 50, and operation states of the first DC/AC converter 71 and the second DC/AC converter 72.

When the first DC/AC converter 71 and the second DC/AC converter 72 are in an idle state, that is, in the mode #1, all the switches of the first three-phase switching unit 61, the second three-phase switching unit 62, and the winding switching unit 50 are turned off. As a result, it is possible to reduce the standby power as compared with the case where the switches of the first three-phase switching unit 61, the second three-phase switching unit 62, and the winding switching unit 50 are turned on.

In the mode #2 in which the first DC/AC converter 71 is in operated and the first DC/AC converter 71 is stopped, the switch of the first three-phase switching unit 61 is turned on, and the switches of the second three-phase switching unit 62 and the winding switching unit 50 are turned off. As a result, the first three-phase winding portion 11 is star-connected, the first three-phase winding portion 11 is driven by the first DC/AC converter 71, and the second three-phase winding portion 12 is in a disconnection state. Thus, it is possible to avoid power consumption by the constituent elements that do not operate. In addition, unnecessary circulating current does not occur, and it is possible to avoid power consumption for driving switches that are not used. At this time, the first DC/AC converter 71 operates as a half-bridge inverter. The method of generating the signals PWM1 in the control unit 90 in this case is the same as the control in a normal half-bridge inverter.

That is, the mode #2 is an operation mode in which the connection state of the first three-phase switching unit 61 is connection, the connection state of the second three-phase switching unit 62 is disconnection, the connection state of the winding switching unit 50 is disconnection, the first DC/AC converter 71 is operated, and the second DC/AC converter 72 is not operated.

In the mode #3 in which the second DC/AC converter 72 is operated and the first DC/AC converter 71 is stopped, the switch of the second three-phase switching unit 62 is turned on, and the switches of the first three-phase switching unit 61 and the winding switching unit 50 are turned off. As a result, the second three-phase winding portion 12 is star-connected, the second three-phase winding portion 12 is driven by the second DC/AC converter 72, and the first three-phase winding portion 11 is in a disconnection state. Thus, it is possible to avoid power consumption by the constituent elements that do not operate. In addition, unnecessary circulating current does not occur, and it is possible to avoid power consumption for driving switches that are not used. At this time, the second DC/AC converter 72 operates as a half-bridge inverter. The method of generating the signals PWM2 in the control unit 90 in this case is the same as the control in a normal half-bridge inverter.

That is, the mode #3 is an operation mode in which the connection state of the first three-phase switching unit 61 is disconnection, the connection state of the second three-phase switching unit 62 is connection, the connection state of the winding switching unit 50 is disconnection, the first DC/AC converter 71 is not operated, and the second DC/AC converter 72 is operated.

In the mode #2 and mode #3, one of the two DC/AC converters is stopped, and it is possible to reduce the switching loss of the DC/AC converter as compared with operating the two DC/AC converters.

In the mode #4, the switches of the first three-phase switching unit 61 and the second three-phase switching unit 62 are turned on, the winding switching unit 50 is turned off, and both of the first DC/AC converter 71 and the second DC/AC converter 72 are operated. As a result, both of the first three-phase winding portion 11 and the second three-phase winding portion 12 are connected and driven by the first DC/AC converter 71 and the second DC/AC converter 72. At this time, the first DC/AC converter 71 and the second DC/AC converter 72 each operate as a half-bridge inverter. In addition, because the switch of the winding switching unit 50 is turned off, unnecessary circulating current via the winding switching unit 50 does not occur. The method of generating the signals PWM1 and PWM2 in the control unit 90 in this case is the same as the control in a single normal half-bridge inverter.

That is, the mode #4 is an operation mode in which the connection states of the first three-phase switching unit 61 and the second three-phase switching unit 62 are connection, the connection state of the winding switching unit 50 is disconnection, and both of the first DC/AC converter 71 and the second DC/AC converter 72 are operated.

In the mode #5, the switches of the first three-phase switching unit 61 and the second three-phase switching unit 62 are turned off, the winding switching unit 50 is turned on, and both of the first DC/AC converter 71 and the second DC/AC converter 72 are operated. As a result, the winding specification of the electric motor 10 is a winding specification in which the phase winding portions of the first three-phase winding portion 11 and of the second three-phase winding portion 12 are connected by each phase. At this time, the combination of the first DC/AC converter 71 and the second DC/AC converter 72 operate as a full-bridge inverter. Because the switches of the first three-phase switching unit 61 and the second three-phase switching unit 62 are turned off, unnecessary circulating current via the first three-phase switching unit 61 and the second three-phase switching unit 62 does not occur. As the method of generating the signals PWM1 and PWM2 in the control unit 90 in this case, the control method in cooperative operation in, for example, Patent Literature 1 can be used.

That is, the mode #5 is an operation mode in which the connection states of the first three-phase switching unit 61 and the second three-phase switching unit 62 are disconnection, the connection state of the winding switching unit 50 is connection, and the first DC/AC converter 71 and the second DC/AC converter 72 are operated.

The control unit 90 generates the signals PWM1, PWM2, SIG3, SIG4, and SIG5 in accordance with the operation definition for each predetermined operation mode as exemplified in FIG. 6.

By defining the operation modes as described above, it is possible for the first DC/AC converter 71 and the second DC/AC converter 72 to operate, when both of the first DC/AC converter 71 and the second DC/AC converter 72 are usable, in the mode #4, the mode #3, or the mode #2 under the operating conditions of the electric motor 10, such as the load torque, the number of rotations (rotation speed), the rotation speed command, and the modulation factor of the electric motor 10. When one of the two DC/AC converters fails, the electric motor system 102 can operate in mode #2 or mode #3 using the other DC/AC converter that is not failed. That is, the control unit 90 can change the number of DC/AC converters to be used for driving the electric motor 10.

Furthermore, when the first DC/AC converter 71 includes switching elements having different characteristics from those included in the second DC/AC converter 72, it is also possible to select the mode #2 or the mode #3 depending on the switching frequency. For example, the first DC/AC converter 71 includes semiconductor elements suitable for high-frequency switching, such as wide bandgap semiconductors, and the second DC/AC converter 72 includes semiconductor elements suitable for low-frequency switching. In this case, it is possible for the electric motor system 102 to operate by combining high-frequency switching and low-frequency switching, that is, to operate in the mode #2 when high-frequency switching is performed or to operate in mode #3 when low-frequency switching is performed. Alternatively, the electric motor system 102 operates in mode #4 when the output power is low, that is, when the required output power is lower than a threshold, or operates in the mode #2 when the output power is high, that is, the required output power is equal to or larger than the threshold. As a result, it is possible to reduce the number of times of switching in the second DC/AC converter 72.

As described above, it is possible to increase the degree of freedom in PWM driving in the electric motor system 102 according to the present embodiment.

Furthermore, by shifting the switching frequency or the switching timing of the first DC/AC converter 71 to be given to the electric motor 10 from that of the second DC/AC converter 72, the current supplied to the electric motor winding as the sum of in-phase currents equivalently has a waveform like the switching frequency. In this case, it is possible to lower the switching frequencies of the first DC/AC converter 71 and the second DC/AC converter 72 as compared with the case where the electric motor 10 actually operates at an equivalent switching frequency, and to reduce the iron loss due to harmonics in the electric motor 10.

As described above, by selecting an appropriate operation mode depending on the operating conditions, it is possible for the electric motor system 102 according to the present embodiment to operate the electric motor 10 with high efficiency. The control unit 90 holds the definitions illustrated in FIG. 6 in, for example, a table or the like, and switches the operation according to an operation mode. Alternatively, the state of each component in each mode illustrated in FIG. 6, that is, the connection state of each switch and the operation state of each DC/AC converter may be designated directly from the outside.

Figure 7:
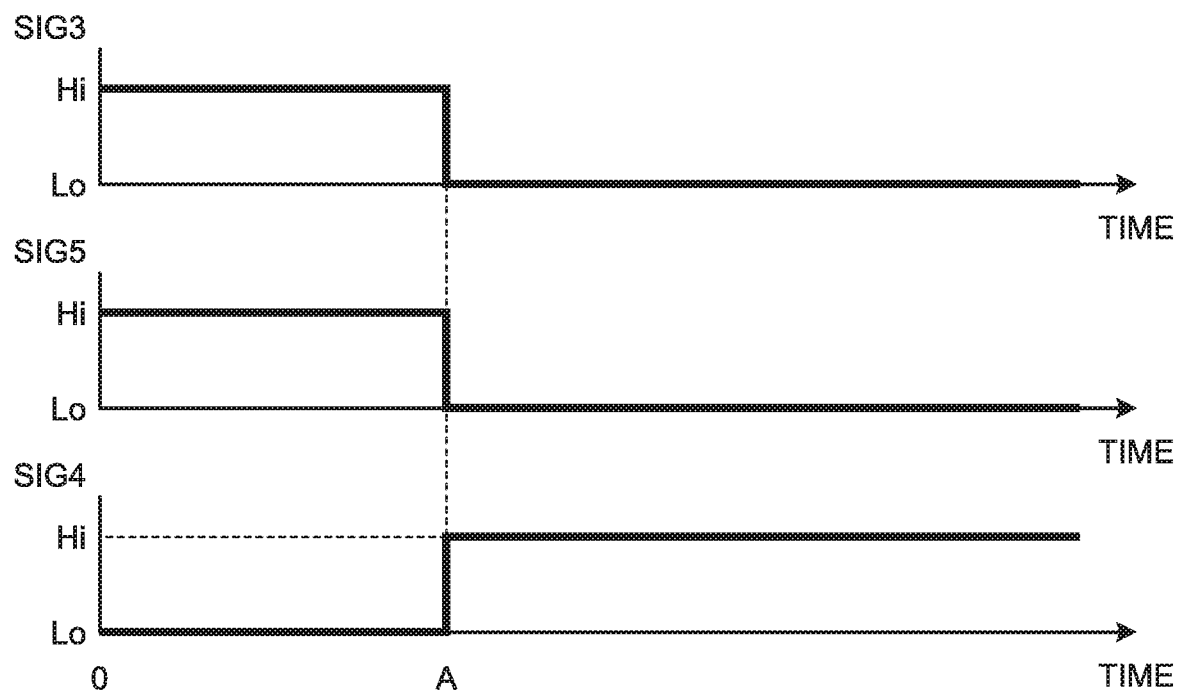
FIG. 7 is a diagram illustrating switching examples of the operation modes in the first embodiment.

Next, specific switching examples of operation modes are described. FIG. 7 is a diagram illustrating switching examples of operation modes in the present embodiment. It is assumed that neither the first DC/AC converter 71 nor the second DC/AC converter 72 has failed. First, when the operation of the electric motor system 102 is started, the operation mode is set to the mode #4 illustrated in FIG. 6. The control unit 90 sets the signals SIG3 and SIG5 to High levels and the signal SIG4 to a Low level according to the definition of the mode #4 and outputs them. As a result, the first three-phase winding portion 11 and the second three-phase winding portion 12 each are star-connected. In addition, the control unit 90 operates the first DC/AC converter 71 and the second DC/AC converter 72 as half-bridge inverters, and generates and outputs the signals PWM1 and PWM2.

Next, at a point A, the operation mode is switched from the mode #4 to the mode #5. Thus, the control unit 90 sets the signals SIG3 and SIG5 to Low levels and the signal SIG4 to a High level, and outputs them. In addition, the control unit 90 operates the first DC/AC converter 71 and the second DC/AC converter 72 as a full-bridge inverter, and generates and outputs the signals PWM1 and PWM2. Switching from the mode #4 to the mode #5 may be performed while the electric motor 10 is stopped, that is, when the absolute value of the output duty reaches a value close to 0 in the PWM control, or during the normal operation of the electric motor 10. The case where the absolute value of the output duty reaches a value close to 0 indicates that, for example, the absolute value of the output duty is equal to or less than a threshold.

Next, a hardware configuration of the control unit 90 according to the present embodiment is described. The control unit 90 is implemented by a processing circuit. This processing circuit may be a processing circuit, which is dedicated hardware, or a control circuit including a processor. In the case of dedicated hardware, the processing circuit is, for example, a circuit called a microcontroller. The processing circuit is, for example, a single circuit, a composite circuit, a programmed processor, a parallel-programmed processor, an Application Specific Integrated Circuit (ASIC), a Field Programmable Gate Array (FPGA), or a combination thereof.

Figure 8:
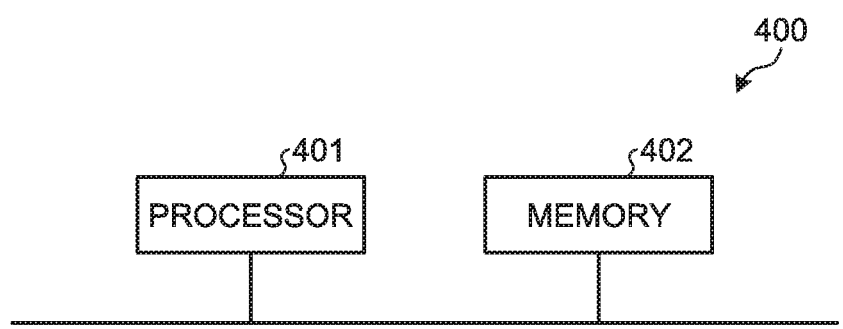
FIG. 8 is a diagram illustrating a configuration example of a control circuit according to first embodiment.

When the processing circuit for implementing the control unit 90 is a control circuit including a processor, this control circuit is a control circuit 400 having a configuration, for example, illustrated in FIG. 8. FIG. 8 is a diagram illustrating a configuration example of the control circuit 400 according to the present embodiment. The control circuit 400 includes a processor 401 and a memory 402. The processor is a Central Processing Unit (also referred to as a CPU, a processing unit, an arithmetic unit, a microprocessor, a microcomputer, a processor, or a Digital Signal Processor (DSP)), or the like. The memory is, for example, a nonvolatile or volatile semiconductor, such as a Random Access Memory (RAM), a Read Only Memory (ROM), a flash memory, an Erasable Programmable Read Only Memory (EPROM), or an Electrically Erasable Programmable Read Only Memory (EEPROM), a magnetic disk, a flexible disk, an optical disk, a compact disk, a mini disk, a Digital Versatile Disk (DVD), or the like.

When the processing circuit for implementing the control unit 90 is the control circuit 400 including a processor, the processing circuit is implemented by the processor 401 reading and executing a program stored in the memory 402 and describing the processing of the control unit 90. The memory 402 is also used as a temporary memory in each processing performed by the processor 401.

The three-phase electric motor system has been described as an example, but switching of winding specifications and operation modes according to the present embodiment is applicable to electric motor systems other than the three-phase motor system.

As described above, the electric motor system 102 according to the present embodiment includes two sets of three-phase winding portions, two DC/AC converters, two three-phase switching units that switch a state of connection between the respective three-phase winding portions in the two sets of three-phase winding portions, and a winding switching unit that switches a state of connection between the two sets of three-phase winding portions. The electric motor system 102 according to the present embodiment has various operation modes by combining the connection states of the switching units and the operation states of the DC/AC converters. As a result, it is possible for the electric motor system 102 according to the present embodiment to switch operation modes depending on the operating conditions, maximize the performance of the electric motor system 102, and drive the electric motor 10 with high efficiency. Furthermore, when one DC/AC converter fails, it is possible for the electric motor system 102 according to the present embodiment to continue the operation of the other DC/AC converter and to continue the operation without stopping the entire electric motor system 102.

Second Embodiment

Figure 9:
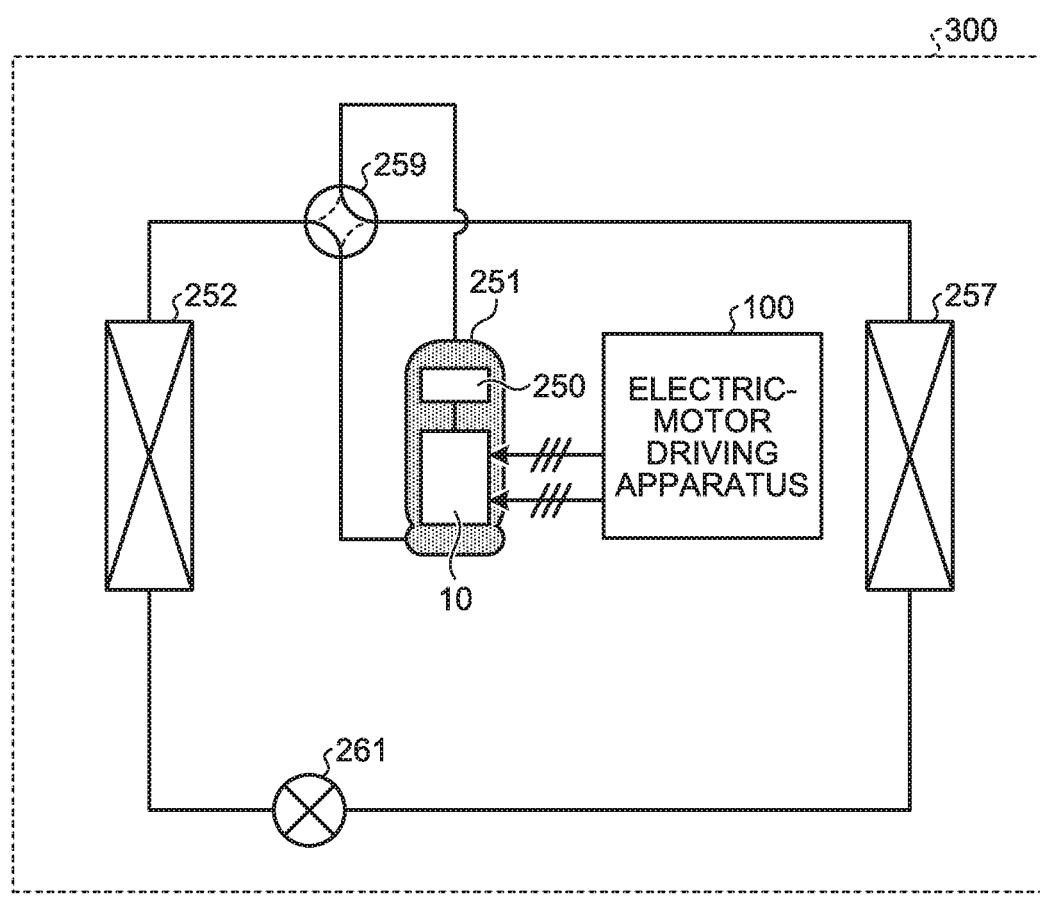
FIG. 9 is a diagram illustrating a configuration example of an air conditioner according to a second embodiment.

FIG. 9 is a diagram illustrating a configuration example of an air conditioner 300 according to a second embodiment of the present invention. The air conditioner 300 according to the present embodiment includes the electric-motor driving apparatus 100 and the electric motor 10 described in the first embodiment. That is, the air conditioner 300 according to the present embodiment is equipped with the electric motor system 102 according to the first embodiment. In FIG. 9, a heat pump apparatus related to the refrigeration cycle in the air conditioner 300 is illustrated, and the other illustration is omitted. The air conditioner 300 according to the present embodiment has a refrigeration cycle in which a compressor 251 equipped with the electric motor 10 according to the first embodiment, a four-way valve 259, an outdoor heat exchanger 252, an expansion valve 261, and an indoor heat exchanger 257 are attached via a refrigerant pipe to constitute a separate-type air conditioner.

A compression mechanism 250 that compresses a refrigerant and the electric motor 10 that operating the compression mechanism 250 are provided inside the compressor 251. The refrigerant circulates between the outdoor heat exchanger 252 and the indoor heat exchanger 257 from the compressor 251 to constitute the refrigeration cycle for cooling and heating. The configuration illustrated in FIG. 9 is applicable not only to an air conditioner but also to an apparatus having a refrigeration cycle, such as a refrigerator or a freezer, that is, a refrigeration cycle apparatus.

As described above, the air conditioner according to the present embodiment is equipped with the electric motor system 102 described in first embodiment, and it is possible to continue the operation of the air conditioner without stopping the entire conditioner although one DC/AC converter fails in electric motor system 102.

The configurations described in the above embodiments are merely examples of the present invention and can be combined with other known techniques, and a part of the configurations can be omitted or changed without departing from the gist of the present invention.

The invention claimed is:

1. An electric motor driving apparatus for driving an electric motor having a winding structure in which a first multi-phase winding and a second multi-phase winding are wound, the electric motor driving apparatus comprising:
  a first inverter connected to the first multi-phase winding and applying a multi-phase alternating-current voltage to the electric motor;

a second inverter connected to the second multi-phase winding and applying a multi-phase alternating-current voltage to the electric motor;
a first switching unit to perform connecting and disconnecting between phases of the first multi-phase winding;
a second switching unit to perform connecting and disconnecting between phases of the second multi-phase winding; and
a third switching unit to perform connecting and disconnecting between the first multi-phase winding and the second multi-phase winding, wherein
the first multi-phase winding includes a first U-phase winding, a first V-phase winding, and a first W-phase winding,
the second multi-phase winding includes a second U-phase winding, a second V-phase winding, and a second W-phase winding, and
the third switching unit includes a U-phase switching unit to perform connecting and disconnecting between the first U-phase winding and the second U-phase winding, a V-phase switching unit to perform connecting and disconnecting between the first V-phase winding and the second V-phase winding, and a W-phase switching unit to perform connecting and disconnecting between the first W-phase winding and the second W-phase winding.

2. The electric-motor driving apparatus according to claim 1, wherein
when the first inverter is driven and the second inverter is stopped, the first switching unit is turned on, and the second switching unit and the third switching unit are turned off.

3. The electric-motor driving apparatus according to claim 1, wherein
when the first inverter and the second inverter are driven, the first switching unit and the second switching unit are turned off, and the third switching unit is turned on.

4. The electric-motor driving apparatus according to claim 1, wherein
when the first inverter is stopped and the second inverter is driven, the first switching unit and the third switching unit are turned off, and the second switching unit is turned on.

5. The electric-motor driving apparatus according to claim 1, further comprising
a controller to switch connection states of the first switching unit, the second switching unit, and the third switching unit depending on operating conditions of the electric motor.

6. The electric-motor driving apparatus according to claim 1, wherein
switching of the connection states of the first switching unit, the second switching unit, and the third switching unit is performed while the electric motor is stopped.

7. The electric-motor driving apparatus according to claim 1, wherein
switching of the connection states of the first switching unit, the second switching unit, and the third switching unit is performed during normal operation of the electric motor.

8. The electric-motor driving apparatus according to claim 1, wherein
the connection states of the first switching unit, the second switching unit, and the third switching unit are switched depending on load torque, a rotation speed, a rotation speed command, or a modulation rate of the electric motor.

9. The electric-motor driving apparatus according to claim 1, wherein
a number of DC/AC converters to be used for driving the electric motor is changed.

10. The electric-motor driving apparatus according to claim 1, wherein
the first switching unit connects, when a connection state is indicated as connection, the phases of the first multi-phase winding to star-connect the first multi-phase winding, or does not connect, when the connection state is indicated as disconnection, the phases of the first multi-phase winding, and
the second switching unit connects, when a connection state is indicated as connection, the phases of the second multi-phase winding to star-connect the second multi-phase winding, or does not connect, when the connection state is indicated as disconnection, the phases of the second multi-phase winding.

11. The electric-motor driving apparatus according to claim 10, wherein
the electric-motor driving apparatus has an operation mode in which a connection state of the first switching unit is connection, a connection state of the second switching unit is disconnection, a connection state of the third switching unit is disconnection, the first inverter is operated, and the second inverter is not operated.

12. The electric-motor driving apparatus according to claim 10 wherein,
the electric-motor driving apparatus has an operation mode in which connection states of the first switching unit and the second switching unit are connection, a connection state of the third switching unit is disconnection, and the first inverter and the second inverter are operated.

13. The electric-motor driving apparatus according to claim 10 wherein,
the electric-motor driving apparatus has an operation mode in which connection states of the first switching unit and the second switching unit are disconnection, a connection state of the third switching unit is connection, and the first inverter and the second inverter are operated.

14. The electric-motor driving apparatus according to claim 1, wherein
the first switching unit, the second switching unit, and third switching unit each include a mechanical relay or a semiconductor switch.

15. A refrigeration cycle apparatus comprising the electric-motor driving apparatus according to claim 1.

16. An electric motor system comprising:
an electric motor having a winding structure in which a first multi-phase winding and a second multi-phase winding are wound;
a first inverter connected to the first multi-phase winding and applying a multi-phase alternating-current voltage to the electric motor;
a second inverter connected to the second multi-phase winding and applying a multi-phase alternating-current voltage to the electric motor;
a first switching unit to perform connecting and disconnecting between phases of the first multi-phase winding;

a second switching unit to perform connecting and disconnecting between phases of the second multi-phase winding; and a third switching unit to perform connecting and disconnecting between the first multi-phase winding and the second multi-phase winding.

17. An electric motor driving apparatus for driving an electric motor having a winding structure in which a first multi-phase winding and a second multi-phase winding are wound, the electric motor driving apparatus comprising:
 a first inverter connected to the first multi-phase winding and applying a multi-phase alternating-current voltage to the electric motor;
 a second inverter connected to the second multi-phase winding and applying a multi-phase alternating-current voltage to the electric motor;
 a first switching unit to perform connecting and disconnecting between phases of the first multi-phase winding;
 a second switching unit to perform connecting and disconnecting between phases of the second multi-phase winding; and
 a third switching unit to perform connecting and disconnecting between the first multi-phase winding and the second multi-phase winding, wherein
 when the first inverter and the second inverter are driven, the first switching unit and the second switching unit are turned off, and the third switching unit is turned on.

18. The electric-motor driving apparatus according to claim 17, wherein
 when the first inverter is stopped and the second inverter is driven, the first switching unit and the third switching unit are turned off, and the second switching unit is turned on.

19. The electric-motor driving apparatus according to claim 17 further comprising
 a controller to switch connection states of the first switching unit, the second switching unit, and the third switching unit depending on operating conditions of the electric motor.

20. The electric-motor driving apparatus according to claim 17, wherein
 switching of the connection states of the first switching unit, the second switching unit, and the third switching unit is performed while the electric motor is stopped.

21. The electric-motor driving apparatus according to claim 17, wherein
 switching of the connection states of the first switching unit, the second switching unit, and the third switching unit is performed during normal operation of the electric motor.

22. The electric-motor driving apparatus according to claim 17, wherein
 the connection states of the first switching unit, the second switching unit, and the third switching unit are switched depending on load torque, a rotation speed, a rotation speed command, or a modulation rate of the electric motor.

23. The electric-motor driving apparatus according to claim 17, wherein
 a number of DC/AC converters to be used for driving the electric motor is changed.

24. The electric-motor driving apparatus according to claim 17, wherein
 the first switching unit connects, when a connection state is indicated as connection, the phases of the first multi-phase winding to star-connect the first multi-phase winding, or does not connect, when the connection state is indicated as disconnection, the phases of the first multi-phase winding, and
 the second switching unit connects, when a connection state is indicated as connection, the phases of the second multi-phase winding to star-connect the second multi-phase winding, or does not connect, when the connection state is indicated as disconnection, the phases of the first multi-phase winding.

25. The electric-motor driving apparatus according to claim 24, wherein
 the electric-motor driving apparatus has an operation mode in which a connection state of the first switching unit is connection, a connection state of the second switching unit is disconnection, a connection state of the third switching unit is disconnection, the first inverter is operated, and the second inverter is not operated.

26. The electric-motor driving apparatus according to claim 24 wherein,
 the electric-motor driving apparatus has an operation mode in which connection states of the first switching unit and the second switching unit are connection, a connection state of the third switching unit is disconnection, and the first inverter and the second inverter are operated.

27. The electric-motor driving apparatus according to claim 24 wherein,
 the electric-motor driving apparatus has an operation mode in which connection states of the first switching unit and the second switching unit are disconnection, a connection state of the third switching unit is connection, and the first inverter and the second inverter are operated.

28. The electric-motor driving apparatus according to claim 17, wherein
 the first switching unit, the second switching unit, and third switching unit each include a mechanical relay or a semiconductor switch.

29. A refrigeration cycle apparatus comprising the electric-motor driving apparatus according to claim 17.

30. An electric motor driving apparatus for driving an electric motor having a winding structure in which a first multi-phase winding and a second multi-phase winding are wound, the electric motor driving apparatus comprising:
 a first inverter connected to the first multi-phase winding and applying a multi-phase alternating-current voltage to the electric motor;
 a second inverter connected to the second multi-phase winding and applying a multi-phase alternating-current voltage to the electric motor;
 a first switching unit to perform connecting and disconnecting between phases of the first multi-phase winding;
 a second switching unit to perform connecting and disconnecting between phases of the second multi-phase winding; and
 a third switching unit to perform connecting and disconnecting between the first multi-phase winding and the second multi-phase winding, wherein
 the electric-motor driving apparatus has an operation mode in which connection states of the first switching unit and the second switching unit are disconnection, a connection state of the third switching unit is connection, and the first inverter and the second inverter are operated, and the first switching unit connects, when a connection state is indicated as connection, the phases of the first multi-phase winding to star-connect the first multi-phase winding, or does not connect, when the connection state is indicated as disconnection, the phases of the first multi-phase winding, and the second switching unit connects, when a connection state is indicated as connection, the phases of the second multi-phase winding to star-connect the second multi-phase winding, or does not connect, when the connection state is indicated as disconnection, the phases of the second multi-phase winding.

31. The electric-motor driving apparatus according to claim 30, wherein the first switching unit, the second switching unit, and third switching unit each include a mechanical relay or a semiconductor switch.

32. A refrigeration cycle apparatus comprising the electric-motor driving apparatus according to claim 30.

* * * * *